March 13, 1951
T. A. BARHAM, SR
2,544,773
ADJUSTABLE LAWN SPRINKLER
Filed Dec. 7, 1949
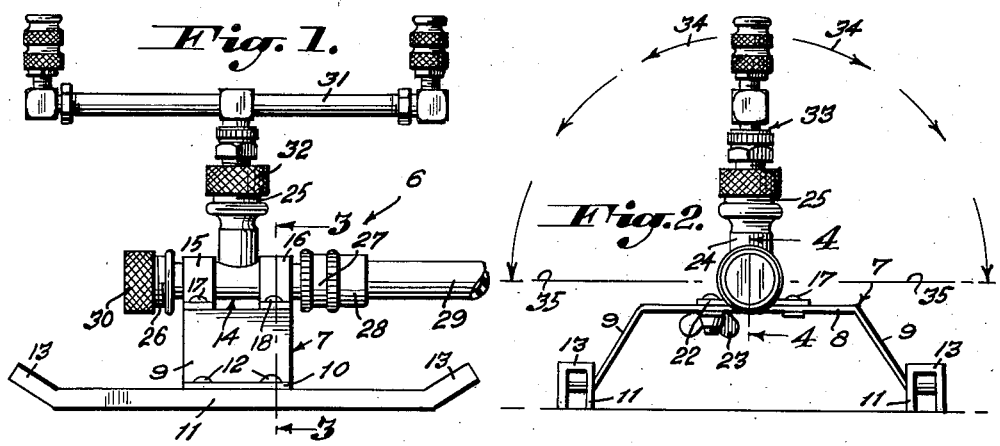
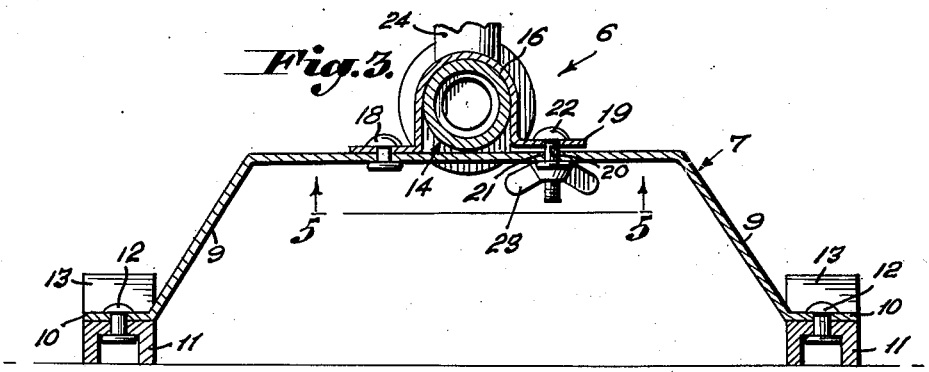
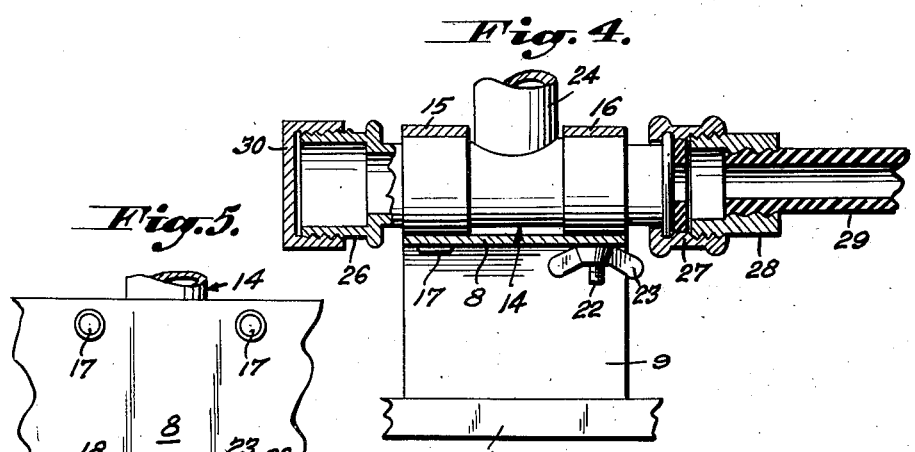
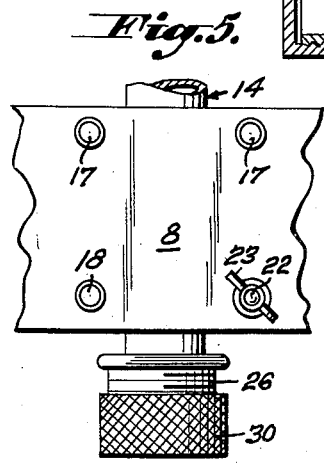
Inventor
Theophilus A. Barham, Sr.
By John N. Randolph
Attorney Patented Mar. 13, 1951

2,544,773

UNITED STATES PATENT OFFICE 2,544,773

ADJUSTABLE LAWN SPRINKLER

Theophilus A. Barham, Sr., Norfolk, Va.

Application December 7, 1949, Serial No. 131,671

2 Claims. (Cl. 248—82)

This invention relates to a novel construction of lawn sprinkler capable of being used with either a rotary or stationary sprinkler head or with a hose nozzle and by means of which a stream of water may be directed therefrom either horizontally, vertically, or at any angle between a horizontal and a vertical plane for directing water from the sprinkling device in any particular area.

A further object of the invention is to provide a device of the aforedescribed character of extremely simple construction which may be economically manufactured and sold and which is so mounted that it may be drawn along the ground or over a lawn for changing the location of the sprinkler without actually grasping the sprinkler thus enabling the sprinkler to be moved from one position to another without shutting off the supply of water thereto.

Still a further object of the invention is to provide a sprinkler which is so constructed that it may be arranged in series with a number of corresponding sprinklers and with hose sections interposed therebetween for simultaneously watering a relatively large area.

Numerous other objects and advantages of the invention will hereinafter become more fully apparent from the following description of the drawing, illustrating a presently preferred embodiment thereof, and wherein:

Figure 1 is a side elevational view showing the sprinkler in an operative position and with a rotary type sprinkler head detachably mounted thereon;

Figure 2 is an end elevational view thereof looking from left to right of Figure 1 and showing a conventional hose nozzle substituted for the rotary sprinkler head;

Figure 3 is an enlarged cross sectional view of the sprinkling device taken substantially along a plane as indicated by the line 3—3 of Figure 1;

Figure 4 is an enlarged cross sectional view taken substantially along a plane as indicated by the line 4—4 of Figure 2, and Figure 5 is a fragmentary bottom plan view taken substantially along a plane as indicated by the line 5—5 of Figure 3.

Referring more specifically to the drawing, the novel lawn sprinkler in its entirety is designated generally 6 and includes a bridge-like supporting member, designated generally 7 comprising a substantially rigid plate which is disposed transversely of the longitudinal axis of the sprinkler 6 and which includes a transversely extending intermediate portion or platform 8 which terminates in downwardly and outwardly inclined portions 9 each of which has an upturned end 10 forming a flange which is disposed in downwardly offset relationship to the platform 8 and substantially parallel thereto. The flanges 10 rest upon the intermediate portions of a pair of runners or ground engaging members 11 and are secured thereto by rivets or other suitable fastenings 12. The runners 11 are thus held by the supporting member 7 is laterally spaced relationship to one another. The runners 11 are disposed substantially parallel and extend longitudinally of the sprinkler 6 and have upturned end portions 13 which are spaced a considerable distance from the supporting member 7. As seen in Figures 2 and 3, the runners 11 may be channel-shaped in cross section and with the channels thereof disposed to open downwardly.

A pipe or conduit 14 extends longitudinally of the sprinkler 6 and transversely across the platform 8 and is held in engagement with the upper side of said platform by two strap members 15 and 16 which engage over portions of the conduit 14. The ends of the strap member 15 are turned outwardly and secured to the upper side of the platform 8 by rivets or similar fastenings 17. The strap 16 likewise has outturned ends disposed above the platform 8 and one of which is secured thereto by a similar rivet or fastening 18. The other outturned end 19 of the strap 16 is provided with an aperture 20 and the portion of the platform 8 disposed therebeneath is provided with an aperture 21. A headed bolt 22 extends downwardly through the apertures 20 and 21 and is threadedly engaged, preferably by a wing nut 23 which bears against the under side of the platform 8. The straps 15 and 16 frictionally engage the portions of the conduit 14 over which they are disposed and frictionally hold said portions in engagement with the platform 8 for resisting rotation of the conduit 14 on its longitudinal axis and relatively to said straps and platform. In order to compensate for wear and loss of this frictional engagement, the bolt 22 and nut 23 is provided so that the nut 23 can be tightened for drawing the strap 16 downwardly into tighter frictional contact with the conduit 14 to maintain a proper amount of frictional resistance to rotation of the conduit. The conduit 14 is provided intermediate of its ends and between the strap members 15 and 16 with an integral transversely extending branch conduit 24 which terminates in an externally threaded nipple 25. One end of the conduit 14 terminates in a corresponding externally threaded nipple 26 and the opposite end of said conduit terminates in a swively mounted internally threaded socket nut 27, corresponding to the usual swivel nut of a garden hose and which is adapted to be connected to the externally threaded or male nipple end 28 of length of garden hose 29. The nipple 26 may be connected to the female end, not shown, of another section of garden hose for connecting a plurality of the sprinklers 6 in series or said end 26 may be closed by an internally threaded cap 30, as illustrated in Figure 4.

In Figure 1 a conventional sprinkler head 31 of the type which is adapted to be revolved by water being discharged therefrom is shown mounted on the branch conduit 24 by a swivel nut 32 engaging the nipple 25. Ordinarily the branch conduit 24 would be disposed in an upright position with a rotary sprinkler 31 applied thereto but it will be readily apparent that the conduit 14 may be turned for positioning its branch 24 at any angle between a vertical and a horizontal position, for utilizing the sprinkler head 31 where the runners 11 are resting on an uneven surface or where it is desired to direct the spray from the sprinkler head 31 away from a building, sidewalk or other area.

It will likewise be readily apparent that a conventional nozzle as shown at 33 in Figure 2 may be substituted for the sprinkler head 31 and attached in a conventional manner to the threaded nipple 25 for directing a spray of water upwardly in a vertical direction with the conduit portion 24 disposed in an upright position as seen in Figure 2, or by turning the conduit 14 within the strap members 15 and 16, the conduit portion 24 may be swung either to the right or to the left from its vertical position through an arc of approximately 90°, as indicated by the arrows 34 and broken lines 35 of Figure 2 for directing the water from the nozzle 33 laterally in either direction and at any desired angle with respect to the sprinkler 6. The runners 11 having the upturned ends 13 enable the sprinkler 6 to be pulled along the ground or across a lawn by the hose 29, which leads to a source of water supply, not shown, for changing the location and/or direction of the sprinkler 6 without necessitating the shutting off of the water supply thereto so that the sprinkler can be manually grasped and moved.

Various modifications and changes are contemplated and may obviously be resorted to, without departing from the spirit or scope of the invention as hereinafter defined by the appended claims.

I claim as my invention:

1. A support for a rigid lawn sprinkler conduit having a horizontal portion and a transverse branch portion, comprising a base including a pair of runners having upturned ends and a bridge member disposed transversely of the runners having ends secured to the intermediate portions of the runners and connecting the runners in spaced parallel relationship, said bridge member having a relatively wide upwardly offset intermediate portion adapted to support thereon a horizontal portion of a rigid lawn sprinkler conduit which has a transversely extending branch portion intermediate of its ends, strap members engaging over the horizontal conduit portion on either side of the transverse branch portion, said strap members being spaced transversely of the bridge member and longitudinally with respect to the runners for positioning the horizontal conduit portion substantially parallel to the runners, and fastenings connecting the ends of the straps to the upwardly offset intermediate bridge portion, said straps having a limited frictional engagement with the horizontal conduit portion whereby said portion may be turned relatively to the bridge member to swing the transverse branch portion through an arc of approximately 180° in a vertical plane and transversely of the longitudinal axes of the runners, certain of the fastenings being adjustable to vary the gripping engagement of the straps with the horizontal conduit portion.

2. A support for a lawn sprinkler comprising a base including a pair of runners having upturned ends and a bridge member extending transversely between the runners having ends secured to the intermediate portions of the runners and connecting the runners in spaced parallel relationship, said bridge member having an upwardly offset intermediate portion disposed above and between the runners, a rigid lawn sprinkler conduit having a straight portion resting on the upwardly offset intermediate portion of the bridge member and supported thereby above, between and longitudinally of the runners and in a plane substantially parallel to the plane of the runners, said straight conduit portion having a transverse branch portion intermediate of its ends, a pair of strap members engaging over said straight conduit portion and disposed one on either side of the transverse branch portion, and fastenings connecting the ends of the straps to the upwardly offset intermediate bridge portion, said straps having a limited frictional engagement with the straight conduit portion whereby said portion may be turned relatively to the bridge member to swing the transverse branch portion through an arc of approximately 180° in a vertical plane and transversely of the longitudinal axes of the runners, certain of said fastenings being adjustable to vary the gripping engagement of the straps with the straight conduit portion, the upturned ends of said runners being disposed beyond the ends of said straight conduit portion.

THEOPHILUS A. BARHAM, Sr.

REFERENCES CITED

The following references are of record in the file of this patent:

UNITED STATES PATENTS

| Number | Name | Date |
|---|---|---|
| 564,610 | Gill | July 28, 1896 |
| 581,876 | Aulls | May 4, 1897 |
| 671,485 | Johnston | Apr. 9, 1901 |
| 1,089,179 | Zeyssolff | Mar. 3, 1914 |
| 1,866,844 | De Vos | July 12, 1932 |
| 2,124,551 | Friedman et al. | July 26, 1938 |